(12) United States Patent
Rudasill-Neigh

(10) Patent No.: US 11,756,155 B1
(45) Date of Patent: Sep. 12, 2023

(54) CREATING AN ORTHO-RECTIFIED VIRTUAL MOSAIC FROM IMAGERY

(71) Applicant: United States of America as represented by the Administrator of NASA, Washington, DC (US)

(72) Inventor: Christopher S. Rudasill-Neigh, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 374 days.

(21) Appl. No.: 17/027,823

(22) Filed: Sep. 22, 2020

(51) Int. Cl.
*G06T 3/40* (2006.01)
*G06T 5/00* (2006.01)

(52) U.S. Cl.
CPC ............ *G06T 3/4038* (2013.01); *G06T 5/001* (2013.01); *G06T 2200/32* (2013.01)

(58) Field of Classification Search
CPC .... G06T 3/4038; G06T 5/001; G06T 2200/32
See application file for complete search history.

(56) References Cited

U.S. PATENT DOCUMENTS

| 2021/0035265 A1* | 2/2021 | Young | G06T 7/207 |
| 2021/0158609 A1* | 5/2021 | Raskob | G06V 10/806 |

FOREIGN PATENT DOCUMENTS

WO  WO-2019148104 A1 *  8/2019 ............. G06N 7/005

OTHER PUBLICATIONS https://docs.sentinel-hub.com/api/latest/data/maxar/world-view/.*
https://gisgeography.com/digitalglobe-satellite-imagery/.*

* cited by examiner

*Primary Examiner* — Casey L Kretzer
(74) *Attorney, Agent, or Firm* — Chistopher O. Edwards; Trenton J. Roche

(57) ABSTRACT

A method for mosaicking and normalizing ortho-rectified images includes selecting imagery from a database using a query tool. The method also includes producing a GeoTIFF a digital elevation model (DEM) or creating a virtual mosaic from the selected imagery.

3 Claims, 1 Drawing Sheet

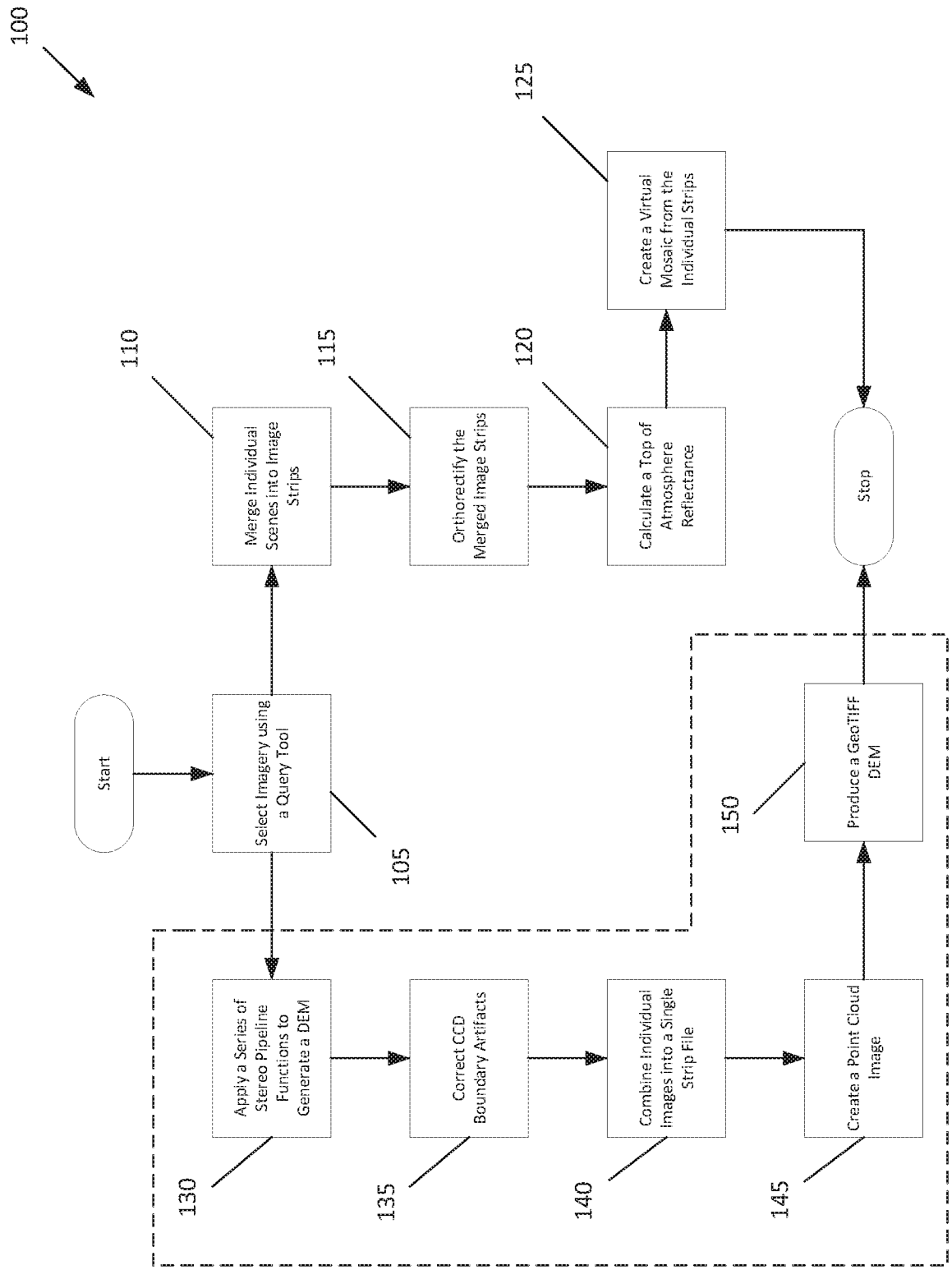

CREATING AN ORTHO-RECTIFIED VIRTUAL MOSAIC FROM IMAGERY

STATEMENT OF FEDERAL RIGHTS

The invention described herein was made by employees of the United States Government and may be manufactured and used by or for the Government for Gave ent purposes without the payment of any royalties thereon or therefore.

FIELD

The present invention relates to an API for enhancing the utility of high-resolution data.

BACKGROUND

Maxar Technology Inc. is a space technology company, specializing in manufacturing communications, Earth observation, radar, and on-orbit servicing satellites, satellites products, and related services. Maxar Technologies (hereinafter "Maxar") has a database of information gathered from Earth orbiting satellites. Maxar has the largest archive of data from their constellation of very high resolution (VHR) satellites that are available to NASA-funded scientists through an agreement with the National Geospatial Agency (NGA).

However, the data is difficult to use by scientists for 3 main reasons. First, most Maxar data received at NASA are not in a standard, geographic information system (GIS)-ready format. Instead, the data comes in Department of Defense National Imagery Transit Format (NITF), often unfamiliar to Earth Scientists. Second, the data has poor horizontal and vertical co-registration, and lastly, once ortho-rectified GeoTiffs are produced from the data, the file size becomes large (~5 gigabytes for an individual image at 0.3 m to 30+ gigabytes for a strip of those images) and require high end computing (HEC) environments to process and analyze many images in an efficient manner.

Thus, an alternative approach that includes an API enhancing the utility of VHR data is needed.

SUMMARY

Certain embodiments of the present invention may provide solutions to the problems and needs in the art that have not yet been fully identified, appreciated, or solved by current technologies. For example, some embodiments of the present invention pertain to an API enhancing the utility of VHR data.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a flow diagram illustrating a method 100 for mosaicking and normalizing ortho-rectified images to create scientific data products, according to an embodiment of the present invention.

DETAILED DESCRIPTION OF THE EMBODIMENTS

To enhance the utility of commercial VHR data, some embodiments utilize an application programming interface (API) to produce on-demand user defined science ready products to support, for example, NASA's EO missions. These enhancements include two primary foci. First, top of atmosphere reflectance 1/2° virtual ortho mosaics—multi-temporal 2 m multispectral imagery that can be used to investigate biodiversity, horizontal forest structure, surface water fraction, and land-cover land-use at the human scale. Second, the VHR digital elevation models (DEMs) are derived with the NASA Ames™ Stereo Pipeline. These enhanced products benefit Earth surface studies on the cryosphere (e.g., glacier mass balance, flow rates and snow depth), hydrology (e.g., lake/waterbody levels, landslides, subsidence) and the biosphere (e.g., vertical forest structure, tree canopy height and cover) among others.

On Demand VHR Regional Mosaics

Systematic ortho-rectified and co-registered multi-temporal, panchromatic 0.3-0.5 m and unsharpened 2-m multispectral imagery is compiled as user defined regional virtual mosaics. These regional virtual mosaics allow for a spatially continuous and temporally consistent reference. This reference provides an easily accessible calibration and evaluation dataset for NASA funded scientists.

Some embodiments may also include a method for mosaicking and normalizing ortho-rectified images to create scientific data products useful for many NASA programmatic activities, including biodiversity, tree canopy closure, surface water fraction, and cropped area for smallholder agriculture, among others.

FIG. 1 is a flow diagram illustrating a method 100 for mosaicking and normalizing ortho-rectified images, according to an embodiment of the present invention. In some embodiment, using the command line query tool (hereinafter "query tool"), the user selects imagery at 105. The imagery may be selected from an archive at, for example, the NASA Goddard Space Flight Center (GSFC). The individual scenes are merged at 110 into image strips and orthorectified at 115, where available, with either the Shuttle Radar Topography Mission (SR™) DEM or the ASTER GDEM V2 DTM. At 120, using a sensor radiance, a top of atmosphere reflectance is calculated with Maxar provided calibration coefficients. At 125, a virtual mosaic is then created from the individual strips.

In the same or alternative embodiment, a series of Ames Stereo Pipeline functions are applied at 130 to the stereo pair to generate a DEM. At 135, WorldView (WV) correct is applied to correct CCD boundary artifacts that manifest themselves in the DEMs, which are due to imperfections in the camera and offset CCD sensor blocks. WV correct significantly attenuates these artifacts by offsets determined empirically. At 140, DigitalGlobe (DG) mosaic is run to combine individual images into a single strip file with a combined RPC camera model. At 145, Stereo, which is the primary tool of Ames Stereo Pipeline, is then run on the stereo strip to create a point cloud image. At 150, point2dem is used to produce a GeoTIFF DEM and/or ortho image from the point cloud.

Systematic processing of available along- and cross-track stereo VHR imagery is used to produce VHR DEMs. A systematic DEM co-registration approach has been applied to generate products with <0.5-1.0 m horizontal and vertical accuracy to support NASA missions and a number of different science programs. These include, for example, Earth balance, ice flow rates, snow depth, hydrosphere (e.g., lake/water body levels, surface elevation dynamics, subsidence from groundwater depletion, thermokarst, etc.), biosphere (e.g., land-cover land-use-change, forest structure, canopy height/cover), and natural hazards (e.g., volcanoes, landslides, earthquakes among others).

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, stricture, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for mosaicking and normalizing orthorectified images, comprising:
   selecting imagery from a database using a query tool;
   producing a GeoTIFF digital elevation model (DEM) or creating a virtual mosaic from the selected imagery;
   applying a series of stereo pipeline functions to generate the DEM;
   correcting boundary artifacts in the generated DEM; and
   combining a plurality of individual images into a single strip file from the correcting boundary artifacts.

2. The method of claim 1, further comprising:
   calculating a top of atmosphere reflectance based on orthorectified image strips.

3. The method of claim 1, further comprising:
   creating a point cloud image using the single strip file.

* * * * *